Feb. 5, 1935.    R. P. LANSING    1,990,039
TRANSMISSION
Filed Feb. 29, 1932
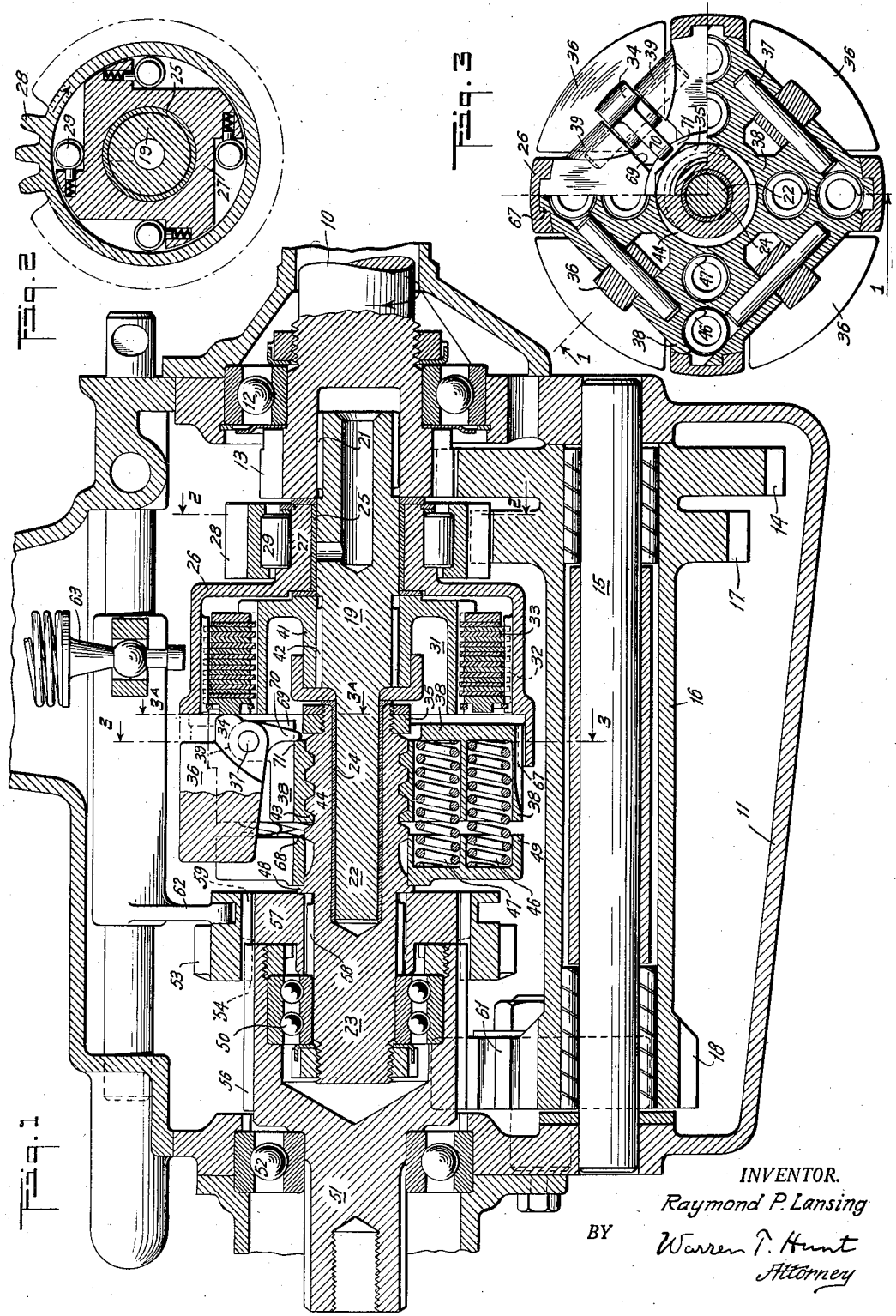
INVENTOR.
Raymond P. Lansing
BY Warren P. Hunt
Attorney Patented Feb. 5, 1935

1,990,039

UNITED STATES PATENT OFFICE 1,990,039

TRANSMISSION

Raymond P. Lansing, Montclair, N. J., assignor, by mesne assignments, to Eclipse Aviation Corporation, East Orange, N. J., a corporation of New Jersey Application February 29, 1932, Serial No. 595,923

17 Claims. (Cl. 74—336)

This invention relates to transmission devices, and more particularly to automatic variable speed transmission devices.

An object of the invention is to provide a variable speed transmission device in which the speed changes are made in accordance with torque reaction.

Another object of the invention is to provide an automatic variable speed transmission device in which the tendency to remain in high gear is controlled by driven shaft speed.

Another object of the invention is to provide an automatic variable speed transmission device with a friction clutch for the high speed gear which is wholly disengaged at high loads.

Another object of the invention is to provide an automatic variable speed transmission with a friction clutch which is influenced both by torque reaction and driven shaft speed.

Another object of the invention is to provide an automatic variable speed transmission device with an improved friction clutch which is responsive to driven shaft speed but which is moved out of contact with the friction members of the clutch when the torque reaction is sufficient to engage the driven shaft at a lower speed ratio.

Another object of the invention is to provide an automatic variable speed transmission in which the engagement of the high gear clutch is controlled by a centrifugal device responsive to the driven shaft speed.

Other objects and features of the invention will be apparent from the following description, in connection with which a preferred embodiment of the invention has been illustrated in the accompanying drawing, in which:

Fig. 1 is a vertical cross sectional view of a transmission constructed according to the invention;

Fig. 2 is a sectional view taken on the line 2—2 of Fig. 1; and,

Fig. 3 is a sectional view taken partially along the lines 3—3 and partially along the lines 3A—3A, the upper right quarter of the figure being taken along the lines 3A—3A and the remainder along the lines 3—3.

Referring to the drawing, 10 is the engine or driving shaft supported in the transmission housing 11 by bearing 12 and provided with a pinion 13 which meshes with a gear 14 preferably integrally formed with sleeve 16 rotatably mounted on fixed shaft 15, which also carries gears 17 and 18. Shaft 10 preferably has a splined connection with a complementary driving shaft 19, as shown at 21, and shaft 19 has its inner end 22 rotatably mounted in driven shaft 23 by bearing 24. A clutch housing 26 is rotatably mounted upon shaft 19 by bearing 25; the reduced portion 27 of which forms the inner race of an overrunning clutch by which it is connected to gear 28 when the gear rotates in a clockwise direction relative to the housing as viewed in Figure 2, under which condition rollers 29 will be moved in a clockwise direction and lock the gear to the housing. If the housing 26 is rotated in a clockwise direction, as viewed in Fig. 2, the rollers 29 will assume the position shown and housing 26 may overrun the gear 28.

A clutch pack 31 composed of a plurality of coacting friction members 32 and 33 is arranged within the housing 26 and adapted to be forced into contact by the cam face or nose 34 of the centrifugal weights 36 which are pivotally mounted at 37 on nut 38 and adapted to move radially between the supporting lugs 39. Friction members 32 and 33 are connected to housing 26 and drum 41 respectively, drum 41 having a splined connection with shaft 19 at 42. Nut 38 has a splined connection with housing 26 at 67 and is provided with an inner threaded portion 43 coacting with a similar threaded portion 44 of the driven shaft 23. Nut 38 has limited axial movement to the right by stop member 35 secured to shaft 23, and is normally urged toward the clutch pack by springs 46 and 47 which coact between the nut and flange 49 mounted against endwise movement on shaft 23 by shoulder 48. The end of shaft 23 is rotatably supported by bearing 50 in the recessed end of a second driven or propeller shaft 51 which is mounted in housing 11 by bearing 52.

Shaft 51 is normally connected to shaft 23 by a gear 53, the internal teeth 54 of which are in mesh both with splines 56 of shaft 51 and the teeth 59 of member 57 that is splined to shaft 23 at 58. Gear 18 is normally unconnected with shaft 51 and is in constant mesh with an idler gear 61 which is adapted to mesh with gear 53 upon the movement of gear 53 toward the left by means of shifter fork 62 and manually operable lever 63. Idler gear 61 and member 57 are preferably positioned whereby gear 53 may be shifted to a position intermediate the two and disconnect shaft 51 from shaft 23, which position will correspond to the neutral position of the transmission.

In the operation of the device, assuming that the parts are in the position shown in Fig. 1 which corresponds to the high speed driving position, the clutch pack 31 is compressed by the weights 36 which have been moved outwardly by centrifugal force until nose 34 is in contact with the clutch and has moved nut 38 a slight distance toward the left against the force of springs 46 and 47. In this position of the parts, the drum 41 and nut 38 will revolve as a unit and drive the shaft 23 by means of the coacting threaded portions 43 and 44, and motion will be transmitted to the propeller shaft 51 by the coupling member 53. During the time that shaft 23 is driven through the clutch pack, housing 26 will overrun the gear 28 because of the before mentioned clutch illustrated in Fig. 2.

If the load on the propeller shaft 51 should increase beyond a predetermined amount, nut 38 will be moved toward the left against the force of springs 46 and 47 and slipping will occur between the friction members and the clutch, whereupon gear 28 will overtake housing 26 and the drive will be taken through pinion 13, gears 14, 17, and 28 to the clutch housing 26 and through the splined connection 67 to the nut 38. The increased torque that is transmitted by the second speed gear 28 will move nut 38 toward the left until it contacts with shoulder 68, in which position the nose 34 will be entirely out of contact with the clutch pack and the friction members will rotate idly without transmitting any driving torque.

It should be noted that in the high speed position of the parts, as the speed of the driven shaft 23 increases the weights 36 will tend to move outwardly by centrifugal force and increase the force against the clutch pack for any engaging position of nut 38. This operation is very desirable in that the tendency to remain in high gear is increased as the driven shaft speed increases, and if the driven shaft speed be sufficiently high, there is no necessity to engage a lower gear ratio. Nut 43 is preferably provided with slots 69 within which arms 70 may move, and the ends 71 of the slots form stops for limiting the outward movement of the weights 38 in the released position of the nut.

If it is desired to reverse the car, gear 53 is moved to its extreme position toward the left, whereupon the drive is from shaft 10, through gear 14, sleeve 16, gear 18, idler pinion 61, and gear 53 to the propelling shaft 51 which will be driven in the opposite direction because of the inter-position of the idler gear 61.

While a preferred embodiment of the invention has been illustrated and described, it is understood that this showing and description are illustrative only and that the invention is not considered as limited to the form shown and described, or otherwise, except by the terms of the following claims:

What is claimed is:

1. A transmission mechanism comprising a driving shaft, a driven shaft, means for transmitting motion from one shaft to the other at a low speed ratio, a friction clutch for connecting the shafts in a higher speed ratio, means responsive to the coaction of driven shaft speed and torque for controlling the clutch, and means including an overrunning clutch for disengaging the low speed drive when the clutch is engaged.

2. A transmission mechanism comprising a driving shaft, a driven shaft, means for transmitting motion from one shaft to the other at a low speed ratio, a friction clutch for connecting the shafts in a higher speed ratio, means responsive to the coaction of driven shaft speed and torque for controlling the clutch, means including an overrunning clutch for disengaging the low speed drive when the clutch is engaged, said clutch controlling means being movable to a non-contacting position with respect to the friction clutch to completely disengage the same when the driven shaft is rotated by the driving shaft at the low speed ratio.

3. A transmission mechanism comprising a driving shaft, a driven shaft, means for transmitting motion from one shaft to the other at a low speed ratio, a friction clutch for connecting the shafts in a higher speed ratio, means responsive to driven shaft speed and torque for controlling the clutch, means for disengaging the low speed drive when the clutch is engaged, and said controlling means including a pressure member having weights pivotally mounted therein and said member being movable axially of the driven shaft by torque reaction.

4. A transmission mechanism comprising a driving shaft, a driven shaft, a gear train for transmitting motion from one shaft to the other at a low speed ratio, a friction clutch for connecting the shafts in a higher speed ratio, means responsive to driven shaft speed and torque for controlling the clutch, an overrunning device in the gear train for disengaging the low speed drive when the clutch is engaged, and said controlling means including a pressure member threaded on the driven shaft having weights pivotally mounted therein, said member being movable by torque reaction to disengage the clutch.

5. A transmission device comprising a driving shaft, a driven shaft aligned therewith, means for coupling the shafts together, gear means for driving the driven shaft at reduced speed, means whereby the driven shaft overruns the gear means when the shafts are coupled together, centrifugal weights carried by the driven shaft for controlling the coupling means, a member threaded on the driven shaft in which said weights are pivotally mounted, and said member being axially movable on the shaft by torque reaction whereby the weights are bodily shifted.

6. A transmission device comprising a driving shaft, a driven shaft aligned therewith, means for coupling the shafts together, gear means for driving the driven shaft at reduced speed, means whereby the driven shaft overruns the gear means when the shafts are coupled together, centrifugal weights carried by the driven shaft for controlling the coupling means, and said weights being pivotally mounted in a member threaded on the shaft and urged toward the coupling means by resilient means coacting against the driven shaft.

7. A transmission device comprising a driving shaft, a driven shaft aligned therewith, means for coupling the shafts together, gear means for driving the driven shaft at reduced speed, means whereby the driven shaft overruns the gear means when the shafts are coupled together, centrifugal weights carried by the driven shaft for controlling the coupling means, and said weights being pivotally mounted on a member adapted to be moved away from the coupling means by torque reaction of the driven shaft.

8. A transmission device comprising a driving shaft, a driven shaft aligned therewith, means for coupling the shafts together, gear means for driving the driven shaft at reduced speed, means whereby the driven shaft overruns the gear means when the shafts are coupled together, centrifugal weights carried by a movable member threaded on the driven shaft for controlling the coupling means, said coupling means comprising a housing driven by the gear means, and coacting clutch friction members secured to the housing and driving shaft respectively arranged to be engaged by the weights.

9. A transmission mechanism comprising a driving shaft, a driven shaft aligned therewith, a housing rotatably mounted on the driving shaft, gear means including an overrunning clutch for connecting the housing to the driving shaft and a friction clutch therein, means for coupling the shafts to rotate as a unit including an axially movable nut threaded on the driven shaft having centrifugal weights thereon for actuating the friction members of the clutch.

10. A transmission mechanism comprising a driving shaft, a driven shaft aligned therewith, a housing rotatably mounted on the driving shaft, gear means including an overrunning clutch for connecting the housing to the driving shaft and a friction clutch therein, means for coupling the shafts to rotate as a unit including an axially movable nut threaded on the driven shaft having centrifugal weights thereon for actuating the friction members of the clutch, and said nut being arranged to be moved axially in a direction away from the friction members at driven shaft loads above a predetermined value.

11. A transmission mechanism comprising a driving shaft, a driven shaft aligned therewith, a housing rotatably mounted on the driving shaft, gear means including an overrunning clutch for connecting the housing to the driving shaft and a friction clutch therein, means for coupling the shafts to rotate as a unit including an axially movable nut threaded on the driven shaft having centrifugal weights thereon for actuating the friction members of the clutch, said nut being arranged to be moved axially in a direction away from the friction members at driven shaft loads above a predetermined value, and means for limiting outward travel of the weights in their inoperative position.

12. A transmission comprising a driving shaft, a driven shaft, means for connecting the shafts in a plurality of different speed ratios, a clutch including friction members for connecting the shafts, said clutch being operable by a nut having a threaded connection with the driven shaft and a splined operative connection with the driving shaft, said nut having centrifugal weights pivotally mounted therein for controlling the friction members, and said nut being movable by torque reaction to move said weights out of the sphere of control of said friction members at a predetermined torque value.

13. A transmission mechanism comprising a driving shaft, a driven shaft coaxial therewith, a friction clutch for connecting the shafts, means including an overrunning clutch for connecting the shafts around the friction clutch, means cooperative with the driven portion of the friction clutch for controlling the same in accordance with driven shaft speed, and means movable by torque reaction for varying the effect of the speed controlling means.

14. A transmission mechanism comprising a driving shaft, a driven shaft coaxial therewith, a friction clutch for connecting the shafts, means including an overrunning clutch for connecting the shafts around the friction clutch, centrifugal weights cooperative with the driven portion of the friction clutch for controlling the same in accordance with driven shaft speed, and means movable by torque reaction for varying the effect of the weights.

15. A transmission mechanism comprising a driving shaft, a driven shaft coaxial therewith, a friction clutch having a hub operatively connected to the driving shaft, a clutch housing, a member having centrifugal weights operatively connecting the housing to the driven shaft, said weights being arranged to control the clutch, said member being axially movable in accordance with torque reaction, and driving means including an overrunning device for connecting the shafts around the clutch.

16. A transmission mechanism comprising a driving shaft, a driven shaft coaxial therewith, a friction clutch having a hub member and a housing member, one of said members being connected to the driving shaft, means responsive to the coaction of torque and driven shaft speed for both controlling the clutch and drivably connecting the second clutch member to the driven shaft, and means including an overrunning device for operatively connecting the shafts around the clutch.

17. A transmission mechanism comprising a driving shaft, a driven shaft coaxial therewith, a friction clutch having a hub member and a housing member, one of said members being connected to the driving shaft, means responsive to the coaction of torque and driven shaft speed for both controlling the clutch and drivably connecting the second clutch member to the driven shaft, and means including an overrunning device for operatively connecting the shafts around the clutch, said torque and speed responsive means having a splined connection with the clutch member and a threaded connection with the driven shaft.

RAYMOND P. LANSING.